(12) United States Patent
Braca et al.

(10) Patent No.: US 10,683,094 B2
(45) Date of Patent: Jun. 16, 2020

(54) AIRCRAFT SEAT

(71) Applicant: OPTIMARES S.P.A., Sezze Scalo Latium (IT)

(72) Inventors: Alessandro Braca, Sezze Scalo (IT);
Alessio Morsicani, Sezze Scalo (IT);
Andrea Giordano, Sezze Scalo (IT)

(73) Assignee: OPTIMARES S.P.A., Sezze Scalo LT (IT)

( * ) Notice: Subject to any disclaimer, the term of this patent is extended or adjusted under 35 U.S.C. 154(b) by 0 days.

(21) Appl. No.: 16/216,732

(22) Filed: Dec. 11, 2018

(65) Prior Publication Data
US 2019/0176991 A1   Jun. 13, 2019

(30) Foreign Application Priority Data
Dec. 11, 2017   (IT) .................. 102017000142230

(51) Int. Cl.
*B64D 11/06*   (2006.01)
*B60N 2/06*   (2006.01)

(52) U.S. Cl.
CPC .......... *B64D 11/0641* (2014.12); *B60N 2/062* (2013.01); *B64D 11/0601* (2014.12); *B64D 11/0602* (2014.12); *B64D 11/0604* (2014.12); *B64D 11/064* (2014.12); *B64D 11/0606* (2014.12); *B64D 11/0648* (2014.12)

(58) Field of Classification Search
CPC .................................... B60N 2/062; B64D 11/0641; B64D 11/0601; B64D 11/0602; B64D 11/0604; B64D 11/0606; B64D 11/064; B64D 11/0628

USPC ......................................................... 297/118
See application file for complete search history.

(56) References Cited

U.S. PATENT DOCUMENTS 6,000,659 A    12/1999 Brauer
2005/0248193 A1*  11/2005 Dowty .................. B64D 11/06
                                                             297/248

(Continued)

FOREIGN PATENT DOCUMENTS

EP          0 850 834 A1    7/1998
WO      WO 01/87120 A1    11/2001

(Continued)

OTHER PUBLICATIONS

Search Report in Italian Patent Application No. IT 102017000142230, dated Jun. 7, 2018.

(Continued)

*Primary Examiner* — Mark R Wendell
(74) *Attorney, Agent, or Firm* — Hershkovitz & Associates, PLLC; Abe Hershkovitz (57) ABSTRACT

The present invention relates to a seat (1) for an aircraft passenger comprising a back part (2) and a sitting part (3), said seat (1) being turned in a first direction so that when a passenger is sitting in said seat (1) he is turned in said first direction, said seat (1) being configured so as to perform a recline movement along a respective recline axis (A) between a sitting position and a recline position, and vice versa, said seat (1) being characterized in that it is configured in such a manner that the back part (2) and the sitting part (3) are apt to perform a translation movement along a translation axis (B), wherein said translation axis (B) is not parallel to said recline axis (A).

23 Claims, 11 Drawing Sheets

(56) References Cited

U.S. PATENT DOCUMENTS

| | | | | |
|---|---|---|---|---|
| 2009/0302158 A1* | 12/2009 | Darbyshire | ............ | B64D 11/06 244/118.6 |
| 2012/0112500 A1* | 5/2012 | Rundle | ................. | B64D 11/00 297/147 |
| 2014/0265460 A1* | 9/2014 | Voigt | ................... | A47C 1/0242 297/61 |
| 2014/0283296 A1 | 9/2014 | Jerome et al. | | |
| 2016/0288910 A1 | 10/2016 | Udriste et al. | | |
| 2017/0029118 A1 | 2/2017 | Ehrmann et al. | | |

FOREIGN PATENT DOCUMENTS

| | | |
|---|---|---|
| WO | WO 2015/155687 A1 | 10/2015 |
| WO | WO 2016/049341 A1 | 3/2016 |
| WO | WO 2016/141158 A1 | 9/2016 |

OTHER PUBLICATIONS

Written Opinion in Italian Patent Application No. IT 102017000142230, dated Jun. 7, 2018.
Extended European Search Report in Patent Application No. EP 18211771.3, dated Mar. 15, 2019.

* cited by examiner

AIRCRAFT SEAT

The present invention relates to an aircraft seat. Such a seat could also be used in other environments, like for example other transport means like trains, or in other waiting environments where relatively restricted space is available but it is desired to ensure comfort for users seated in said seat.

More precisely, the present invention relates to a reclinable seat of the type that is apt for long-distance journeys, in particular for the business class on aircraft. Such seats enable the passenger to adopt both a reclining/sitting position, a recline position and possibly also an extended/bed position, for greater comfort during sleep.

In order to meet the space requirements of air lines, in order to increase the density of seats, seats are arranged so as to reduce the distance between the seats of different rows and pairs of seats. However, this occurs at the cost of passenger comfort, penalising the roominess of the space at the disposal of the passenger.

The aim of the present invention is to maximize the efficient use of the cabin space of an aircraft and at the same time ensure comfort and practicality to passengers, by means of a solution that is cheap and easy to install.

An object of the present invention is a seat for an aircraft passenger comprising a fixed support portion and a portion that is movable with respect to said fixed portion, said movable portion providing a back part and a sitting part, said seat being turned in a first direction so that when a passenger is sitting in said seat he is turned in said first direction, said seat being configured in such a manner that said movable portion performs a recline movement along a respective recline axis between a sitting position and a recline position, and vice versa, in a plan view of said seat said recline axis being an apparent axis of substantial symmetry of the seat, said seat being characterized in that it is configured so that the movable portion is apt to perform a translation movement with respect to the fixed portion parallel to a single and predetermined translation axis, wherein from a plan view of said seat, said translation axis is oriented with respect to said recline axis by a predetermined fixed angle comprised between 2° and 18°, in particular between 2° and 12°, preferably equivalent to about 5°.

Further, according to the invention, said seat can be configured so as to perform said translation movement, before performing said recline movement from said sitting position to said recline position or during said recline movement.

Always according to the invention, said seat can further comprise a leg rest, arranged so that when said seat is in the maximum recline configuration, said back part, said sitting part and said leg rest cooperate so as to form a bed element for accommodating a passenger in an extended position.

Still according to the invention, said leg rest can have a substantially trapezial or triangular shape with the narrowest portion arranged at the feet of a possible passenger sitting on the seat.

Further, according to the invention, said seat can provide a fixed back wall and/or a fixed side wall, apt to delimit and circumscribe the space of the passenger sitting on said seat.

Preferably according to the invention, said seat can provide driving means for driving the translation movement of said movable part with respect to said fixed part, said driving means being a telescopic screw.

Always according to the invention, between said fixed part and said movable part sliding telescopic guides can be provided parallel to said translation axis.

Further, the present invention relates to a pair of seats for aircraft as described previously, alongside one another, wherein each seat is turned in a direction opposite the other so that each passenger sitting on a seat is turned to the other passenger sitting on the other seat.

In particular, according to the invention, the recline axes of each seat can be parallel to one another, but do not coincide.

More in particular, according to the invention, the translation axes of each seat can be parallel to one another, but not parallel to the recline axes.

Further, according to the invention, said pair of seats can comprise a central dividing septum, arranged between the two seats connecting the leg rests of each seat, dividing the space allocated for the two seats.

Lastly, the present invention relates to a cabin for aircraft comprising a longitudinal axis and comprising at least one seat as described previously, characterized in that the translation axis of each of said at least one seat is parallel to the longitudinal axis of said cabin.

The invention will now be described, by way of non-limiting example, with particular reference to the figures in the appended drawings, in which.

Figure 1:
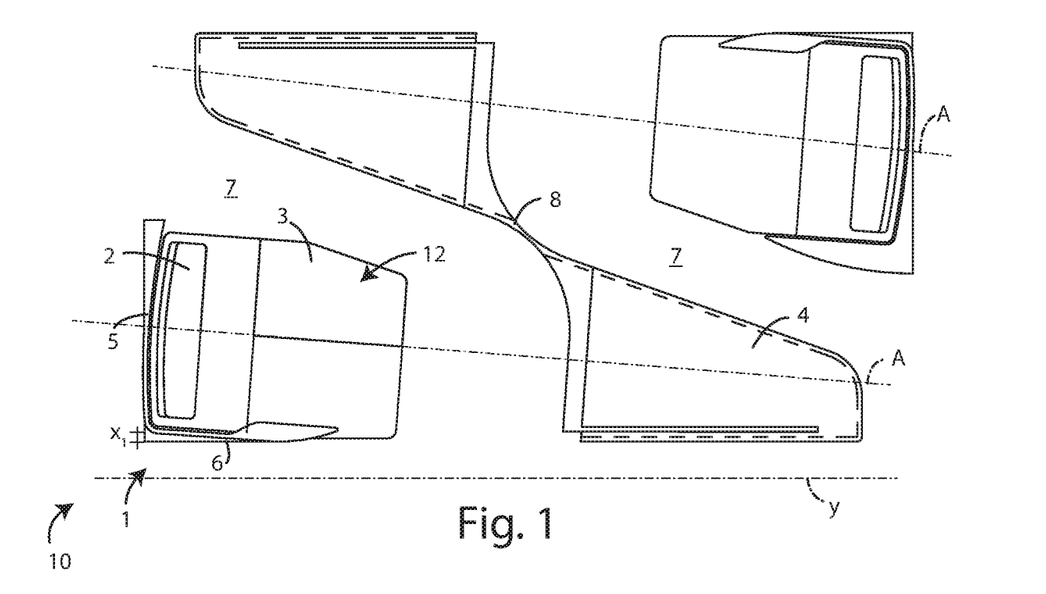
FIG. 1 shows a top view of a pair of seats for aircraft according to the invention, wherein each seat is in a retracted or sitting position.
Figure 2:
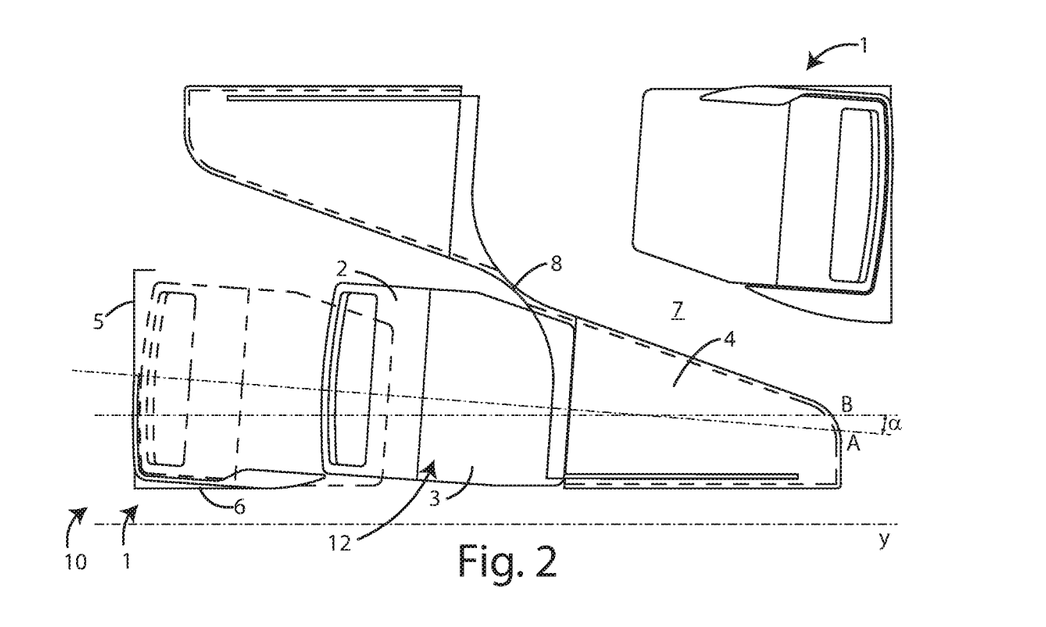
FIG. 2 shows a top view of the pair of seats of FIG. 1, wherein one seat is translated with respect to the start position thereof.
Figure 3:
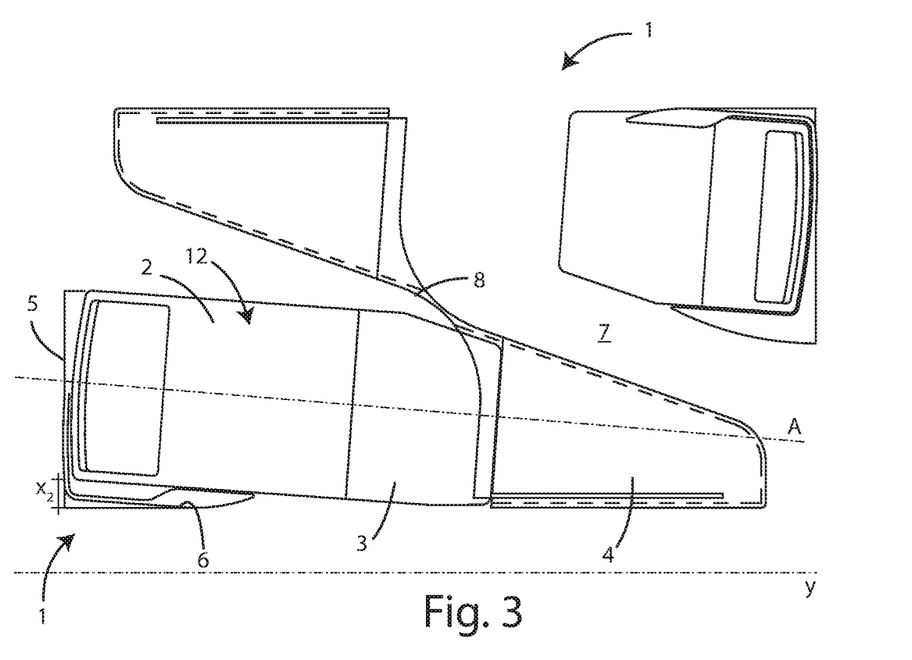
FIG. 3 shows a top view of the pair of seats of FIG. 1, wherein one seat is in an extended or bed position.
Figure 4A:
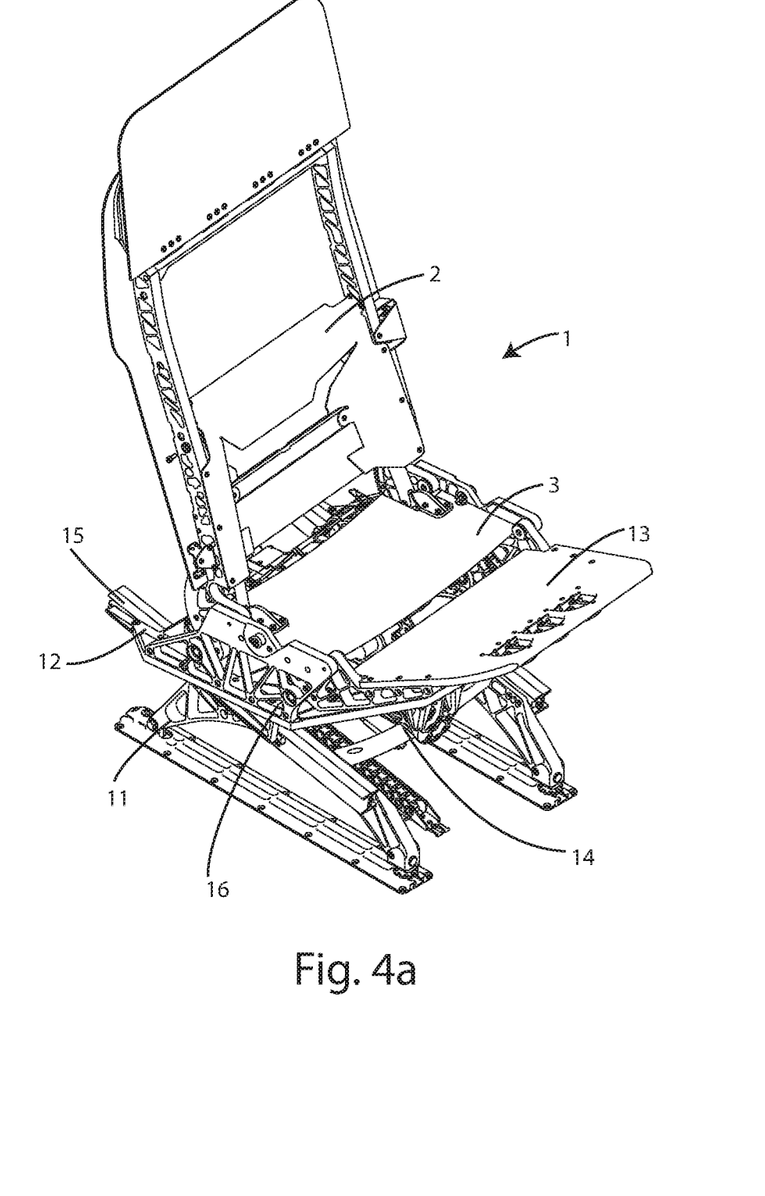
FIGS. 4a-4d show respectively prospective, lateral, bottom and back views of a seat according to the invention in a second embodiment in a retracted or sitting position.
Figure 4B:
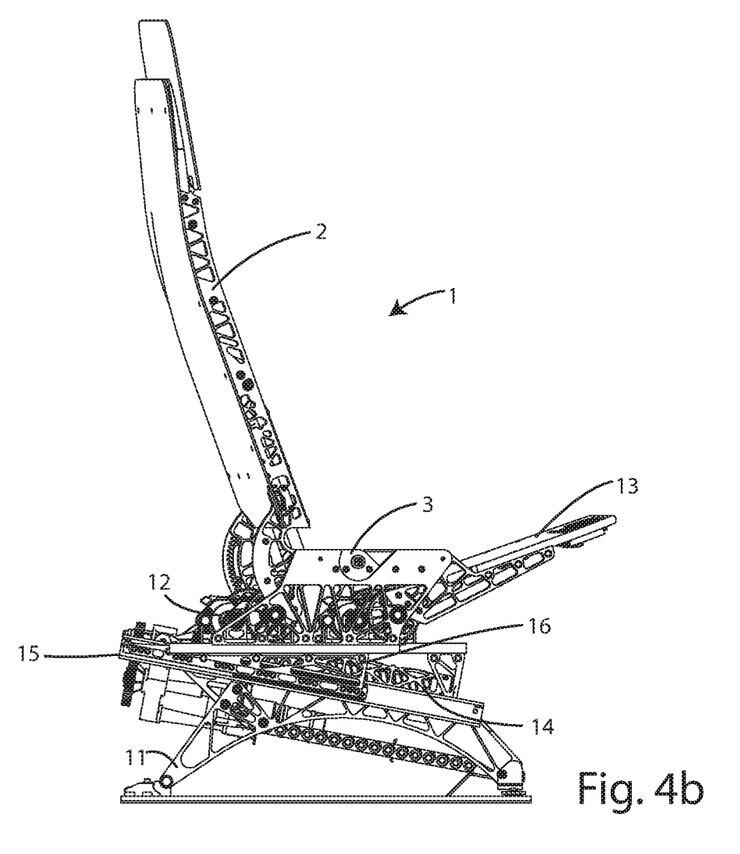
Figure 4C:
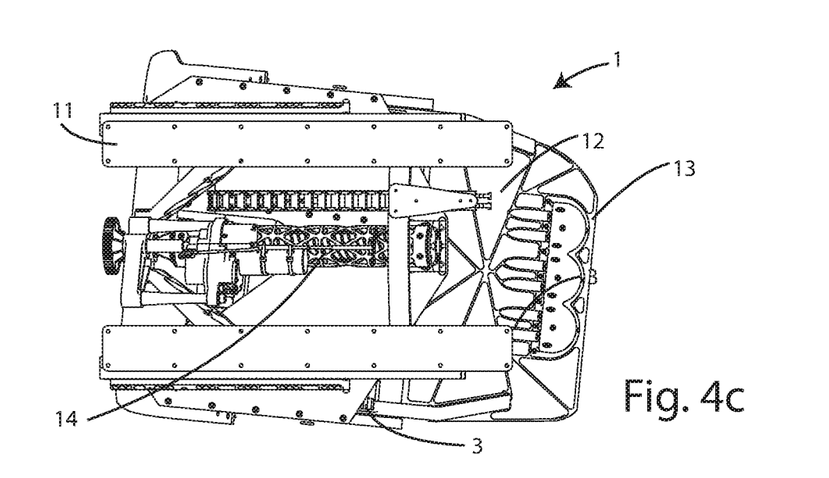
Figure 4D:
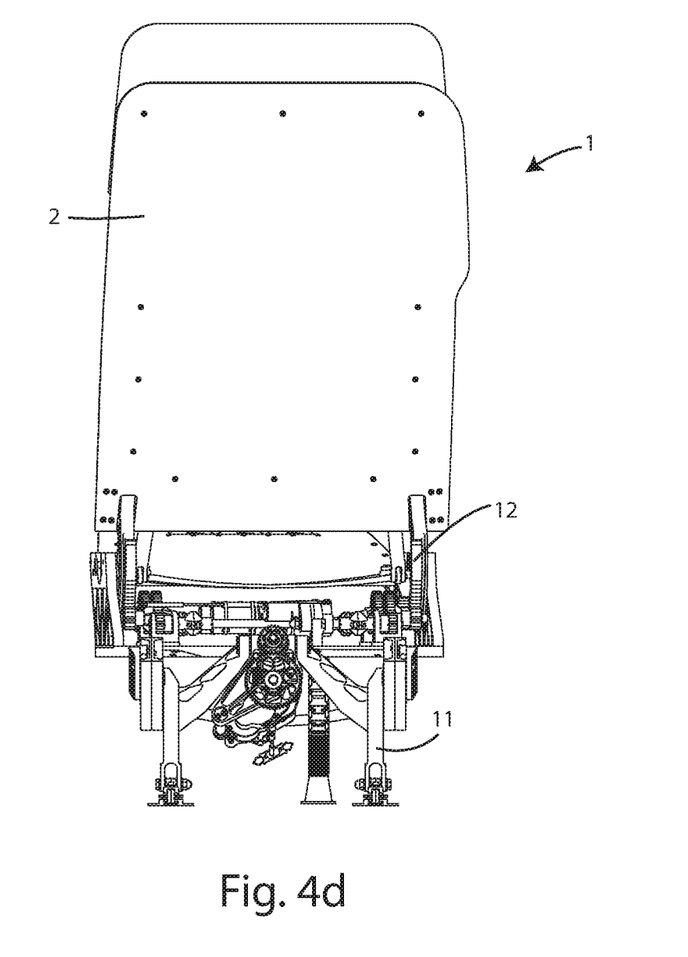
Figure 5A:
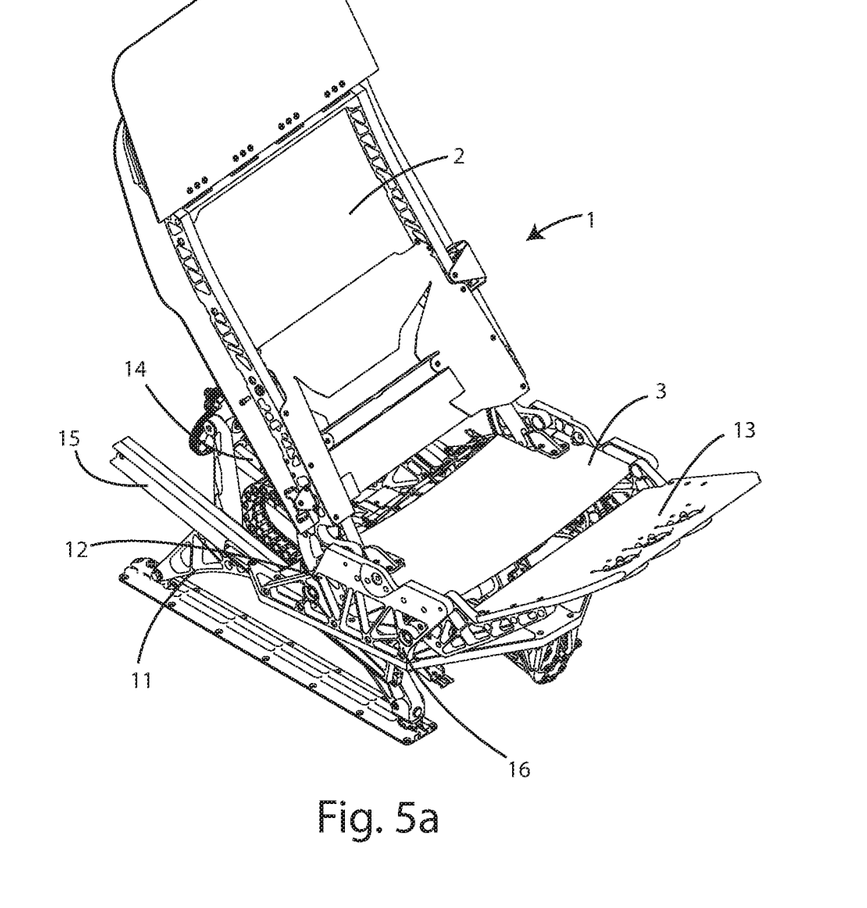
FIGS. 5a-5d show respectively prospective, lateral, bottom and rear views of the seat of FIG. 4a in a "cradle" or intermediate position.
Figure 5B:
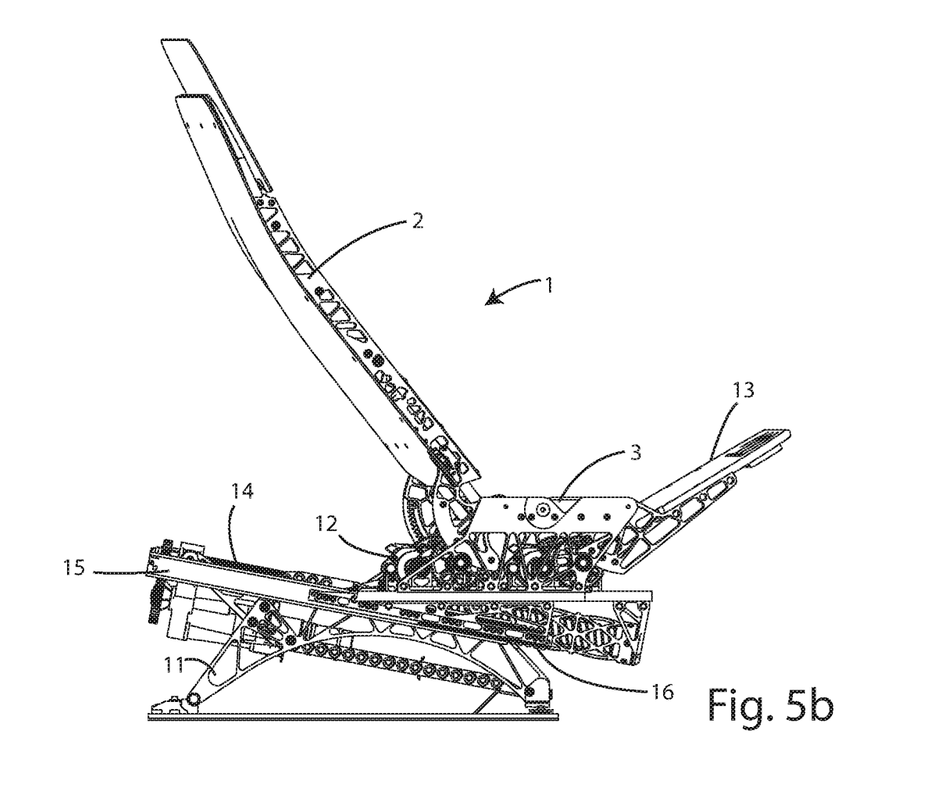
Figure 5C:
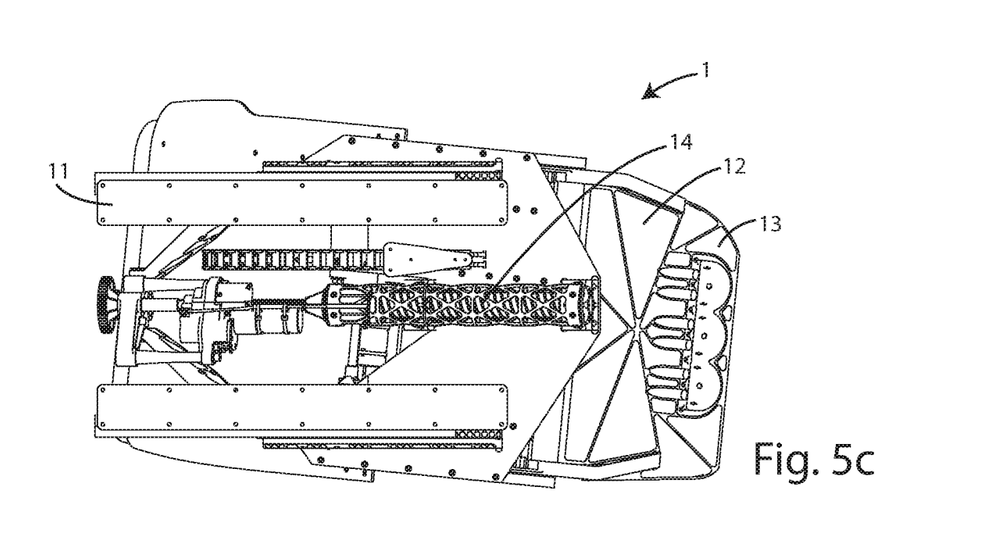
Figure 5D:
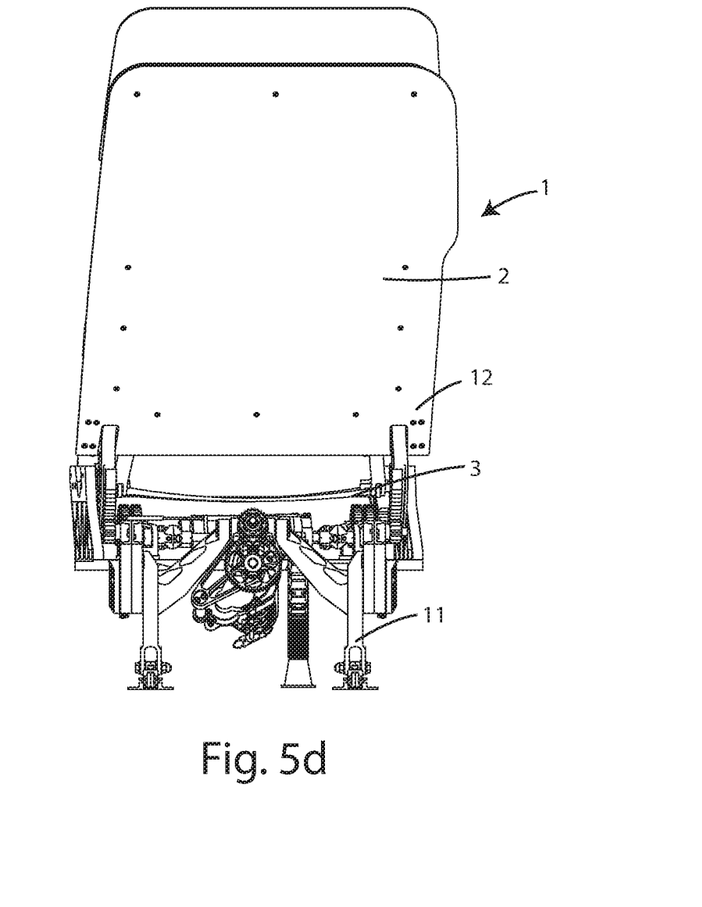
Figure 6A:
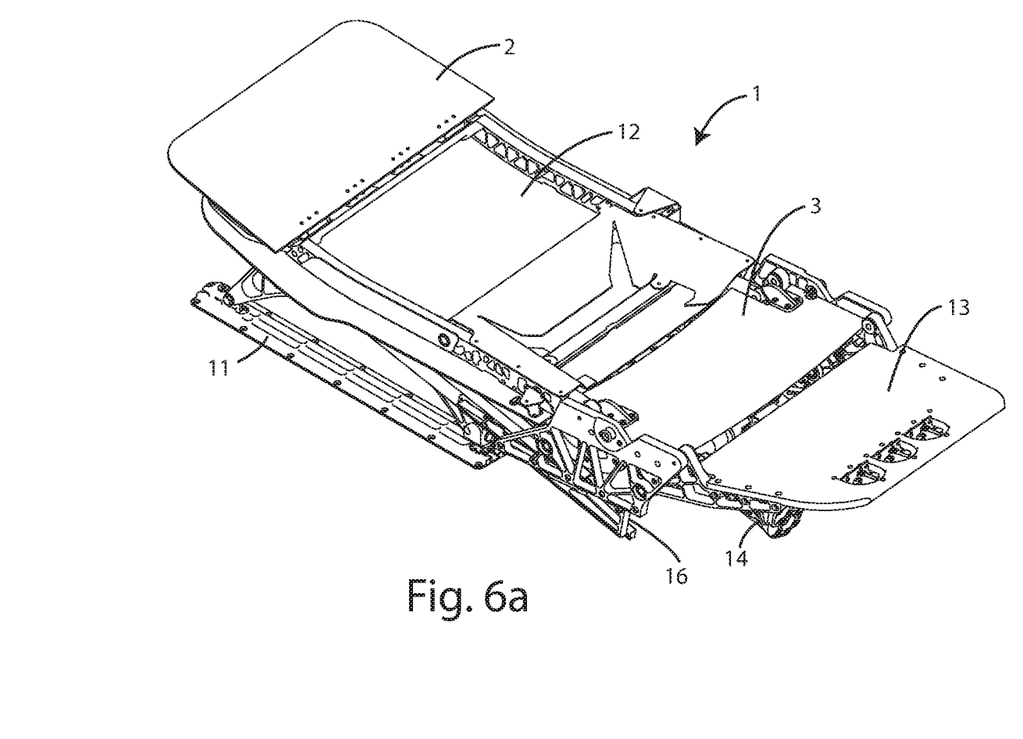
FIGS. 6a-6d show respectively prospective, lateral, bottom and rear views of the seat of FIG. 4a in an extended or bed position.
Figure 6B:
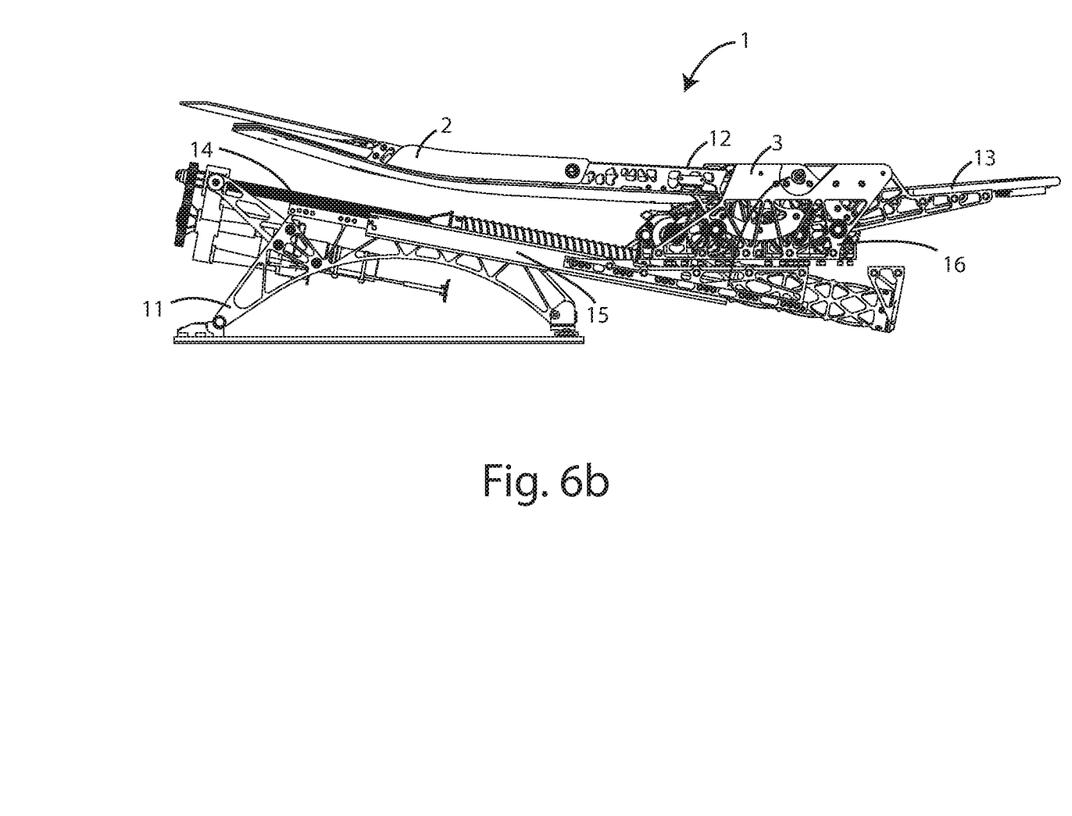
Figure 6C:
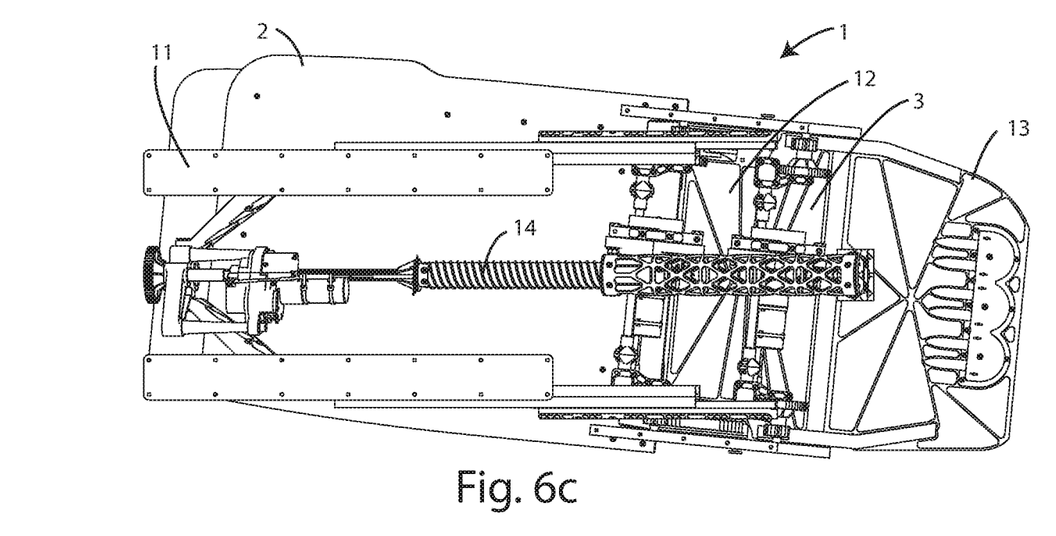
Figure 6D:
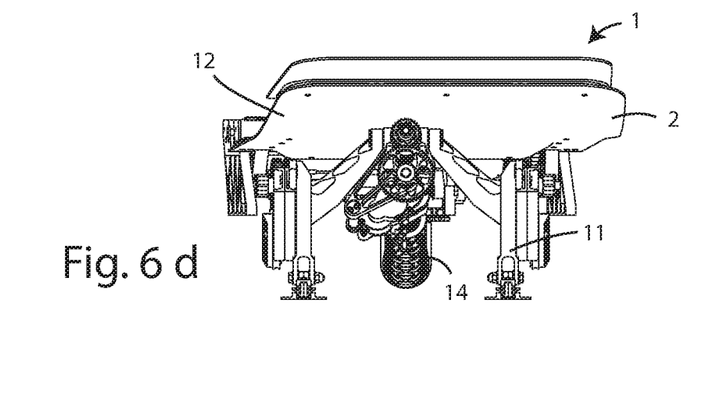

With reference to FIGS. 1-3, a seat for aircraft according to the invention, indicated by the numeric reference 1, is observed.

Said seat 1 provides a back part 2 and a sitting part 3, and is configured so as to perform a recline movement along a respective recline axis A between a sitting position (shown in FIG. 1) and a recline position (shown in FIG. 3), and vice versa.

The sitting position is the position wherein the angle between the sitting part 3 and the back part 3 is substantially vertical, near 90°, so that a passenger sitting in said seat 1 is in a sitting position, with the legs bent and the back substantially erect, supported by said back part 2.

The recline position is the position wherein the angle between the sitting part 3 and the back part 2 is much greater than 90°, for example 110°, so that a passenger sitting in said seat 1 is in a reclined position, with the back tilted, supported by said back part 2.

The bed position is a version of the recline position, wherein the angle between the back part 2 and the sitting part 3 is about 180°, so that a passenger sitting in said seat 1 is in an extended position, with the back extended, supported by said back part 2. If the seat 1 also has a leg rest 4, arranged so as to be coplanar with the back part 2 and with the sitting part 3, also the legs of the passenger would be supported so as to form a bed element (as shown in FIG. 3).

The recline axis A is the imaginary axis along which, in a plan view of the seat 1 (as shown in FIG. 1), the recline movement of the back part 2 occurs with respect to the sitting part 3 and is a longitudinal axis A of substantial symmetry of the seat 1.

In the present invention reference is made to a recline movement of the back part with respect to the sitting part, without the mechanism being specified, it being technically possible to make the mechanism in different modes.

The seat 1 is turned in a first direction so that when a passenger is sitting in the seat 1 he is turned in said first direction, in other words with his face looking in that first direction.

The seat 1 according to the invention is configured so that the back part 2 and the sitting part 3 are apt to perform a translation movement along a translation axis B, wherein the translation axis B is not parallel to the recline axis A.

The translation axis B is, in a plan view of the seat 1 (like that of FIG. 2), the axis along which the back part 2 and the sitting part 3 perform a translation movement forwards or backwards by a determined fixed or variable distance with respect to the start position thereof.

As for example shown in FIG. 2, the back part 2 and the sitting part 3 have performed a forward translation movement with respect to the start position of FIG. 1 (shown as a dashed line in FIG. 2), moving parallel to the translation axis B.

Generally, a seat has a fixed support part, anchored to the floor of the aircraft, and a movable part that is movable with respect to said fixed part that comprises the back part and the sitting part. This translation movement of the movable part, and thus of the back part and of the sitting part can occur with respect to the support part that remains anchored to the floor of the cabin of the aircraft.

More in particular, the seat 1 according to the invention is configured so that the movable portion, comprising the back part 2 and sitting part 3, is apt to perform a translation movement with respect to the fixed support portion, parallel to a single and predetermined translation axis B, wherein from a plan view of said seat 1, said translation axis B is oriented with respect to said recline axis A by a predetermined fixed angle $\alpha$ comprised between 2° and 18°, in particular between 2° and 12°, preferably equivalent to about 5°.

According to the invention, the seat 1 is in fact apt to translate along a single translation axis B that is predetermined and oriented with respect to the recline axis A at an angle that is predetermined at the moment of installation of the seat 1 on the cabin of an aircraft.

Owing to the solution according to the invention, it is possible to distribute the seats 1 in the cabin 10 of an aircraft in more appropriate arrangements in terms of passenger comfort and at the same time gain more space for arranging a greater number of seats.

In fact, for the seat 1 of the FIGS. 1-3, following the movement forwards of the back part 2 and of the sitting part 3, which occupies the front free space that was first dedicated to the legs, a new rear free space is formed in which the back 2 can be reclined without occupying further space in the cabin of the aircraft.

The recline movement of the back part with respect to the sitting position can occur both simultaneously with the translation movement of the back part and sitting part, and at the end of this movement.

For example, in the configuration shown in FIGS. 1-3, when the seat 1 provides a back wall 5 and a side wall 6 that are fixed, for example at the aisle of the aircraft or the window, that delimit and circumscribe the space of the passenger sitting on said seat 1, owing to the different translation trajectory of the sitting part 3 and of the back part 2 with respect to the recline axis A, the seat 1 according to the invention when it is in the reclined bed position gains greater width space at the back part 2. This is exemplified in FIGS. 1 and 3 by the distance $x_1$ and $x_2$, which refers to the distance between one side of the seat 1 and the side wall 6. This enables the passenger to have greater comfort when in an extended position and at the same time enables the seat not to extend beyond the space allocated to the passenger.

In fact, the angle $\alpha$ between the two axes A and B generates an increase of the transverse distance when the movable upper part 12 translates with respect to the fixed part 11, directly proportional to the angle $\alpha$ itself. In the case of an angle $\alpha$ of 5° the distance $X_2$, when the seat 1 is in the extended position, is about 2 inches (about 5 cm), whereas the start distance $X_1$, when the seat 1 is in a sitting position, is the equivalent of about ¼ inch (about 6.35 mm).

In other words, as for example the side constraint on the primary structure, such as the furniture, in particular the side wall 6, the seat 1 during movement thereof to the bed position undergoes a transverse movement x, which becomes concrete as an increase in the distance when in the bed position, giving the passenger more space at the shoulder height, thus greater comfort.

Further, the advantage of the present invention is observed, for example, when a pair of seats 1 is placed alongside one another, each turned in opposite directions to one another, so that each passenger sitting on the relative seat 1 looks in the direction of the other, with the recline axes A of each seat 1 parallel to one another, but not coinciding and the translation axes B of each seat 1 parallel to one another, but not parallel to the recline axes A (as shown in FIGS. 1-3).

Two seats 1 are alongside when they substantially cover the same space in length, with respect to the cabin 10 of an aircraft, making up a row of seats 1.

In other embodiments that are not shown, wherein pairs of seats 1 are provided that are alongside and turned in opposite directions, the recline axes A of each seat 1 may not be necessarily parallel to one another, and/or the translation axes B of each seat 1 may not be necessarily parallel to one another.

This movement enables the space to be optimized when the seat is in the bed position, with the same module width, i.e. pair of seats.

Further, this movement enables the space to be optimized when the seat is in the bed position, with the same module width, complying with the minimum transit dimensions to access the seat place.

Preferably, each seat 1 has a corresponding leg rest element 4, in the fixed example and separated from the sitting part 3-back part 2 assembly, having a substantially trapezial or triangular shape (when viewed from above, as in FIGS. 1-3), with the narrowest portion arranged at the feet of a possible passenger sitting on the seat 1. When two seats 1 are placed alongside one another as described above, each seat 1 benefits, at the back part 2, from greater space, saved from the smaller overall dimensions of the leg rest 4 of the seat 1 alongside, which is to the advantage of the comfort of the passenger when seated in the seat 1 also forming a transit space 7 to permit the transit of the passenger to access this seat 1.

Preferably, said assembly of two seats 1 comprises a central dividing septum 8, arranged between the two seats 1 that is able to connect the two leg rests 4 and to divide the space allocated for the two seats 1.

Preferably, when a seat 1 or the pair of seats 1 is inserted into an aircraft cabin 10, comprising a longitudinal axis y, at least one seat 1 or both the seats 1 is arranged so as to have the translation axis B parallel to the longitudinal axis Y of the cabin 10.

In this manner, when the seat 1 is in the bed position, as shown in FIG. 3, it does not take up aisle space, and at the same time fosters passenger comfort.

In other embodiments, the translation axis B of the seats 1 may not necessarily be parallel to the longitudinal axis Y of the cabin 10.

In general, the principle according to the invention is applicable to all the reclinable seats, regardless of the orientation of the seat with respect to the direction of travel.

It is also applicable to pairs of seats that are parallel to one another and/or all turned in the same direction.

Observing FIGS. 4-6, a particular embodiment of the seat 1 according to the invention is shown, wherein the same numerical references are used as for the seat 1 described for FIGS. 1-3, wherein the fixed support part is indicated by the numerical reference 11 and the movable part with the reference 12.

In the specific embodiment, between the lower fixed part 11, which is integral with the floor, and the movable part 12 telescopic sliding guides 15 are provided that guide the translation, and in particular the sliding, of the movable part 12 parallel to the translation axis B.

The sliding of the movable upper part 12 is driven by driving means, in particular motor-driven, which in the particular embodiment is a telescopic screw 14, which enables a considerable stroke to be executed. Nevertheless, in other embodiments other solutions can be used.

The reclining mechanism of the back part 2 with respect to the sitting part 3 is constrained to the structure 16 of the sitting part 3 and can be actuated electrically or also mechanically. The structure 16 of the sitting part 3 is oriented, from a plan view, parallel to the recline axis A (the lateral sides are in fact parallel to the recline axes A) and is configured so as to translate parallel to the translation axis B.

The seat 1 can provide a leg rest 13 portion constrained to the front part of the structure or frame 16 of the sitting part 3, driven electrically or mechanically.

In what precedes, the preferred embodiments were disclosed and variations on the present invention were suggested but it must be understood that those skilled in the art can make modifications and changes without departing from the relative scope of protection, as defined by the appended claims.

The invention claimed is:

1. An aircraft passenger seat comprising a fixed support portion and a movable portion that is movable with respect to said fixed support portion, said movable portion including a back part and a sitting part, said seat being turned in a first direction so that a passenger sitting in said seat is turned in said first direction, said seat being configured in such a manner that said movable portion performs a recline movement along a respective recline axis between a sitting position and a recline position, and vice versa, in a plan view of said seat, said recline axis being an apparent axis of substantial symmetry of the seat, wherein said seat is configured so that the movable portion is apt to perform a translation movement with respect to the fixed portion, parallel to a single and predetermined translation axis, wherein from a plan view of said seat, said translation axis is oriented with respect to said recline axis by a predetermined fixed angle comprised between 2° and 18°.

2. The aircraft passenger seat according to claim 1, wherein said seat is configured to perform said translation movement, before performing said recline movement from said sitting position to said recline position or during said recline movement.

3. The aircraft passenger seat according to claim 2, wherein said seat provides at least one of, a fixed back wall and a fixed side wall, apt to delimit and circumscribe a space of a passenger sitting on said seat.

4. The aircraft passenger seat according to claim 2, further comprising a leg rest arranged so that when said seat is in the maximum recline position, said back part, said sitting part and said leg rest cooperate so as to form a bed element for accommodating a passenger in an extended position.

5. The aircraft passenger seat according to claim 4, wherein said leg rest has a substantially trapezoidal or triangular shape, with the narrowest portion arranged at the feet of a passenger sitting on the seat.

6. The aircraft passenger seat according to claim 5, wherein said seat provides at least one of, a fixed back wall and a fixed side wall, apt to delimit and circumscribe a space of a passenger sitting on said seat.

7. The aircraft passenger seat according to claim 4, wherein said seat provides at least one of, a fixed back wall and a fixed side wall, apt to delimit and circumscribe a space of a passenger sitting on said seat.

8. The aircraft passenger seat according to claim 1, further comprising a leg rest arranged so that when said seat is in the maximum recline position, said back part, said sitting part, and said leg rest cooperate to form a bed element for accommodating a passenger in an extended position.

9. The aircraft passenger seat according to claim 8, wherein said leg rest has a substantially trapezoidal or triangular shape, with the narrowest portion arranged at the feet of a passenger sitting on the seat.

10. The aircraft passenger seat according to claim 9, wherein said seat provides at least one of, a fixed back wall and a fixed side wall, apt to delimit and circumscribe a space of a passenger sitting on said seat.

11. A pair of aircraft passenger seats for aircraft according to claim 9, alongside one another, wherein each seat is turned in a direction opposite the other direction so that each passenger sitting on a seat is turned to another passenger sitting on another seat.

12. The pair of aircraft passenger seats according to claim 11, comprising a central dividing septum arranged between the two seats connecting the leg rests of each seat and dividing a space allocated for the two seats.

13. The aircraft passenger seat according to claim 8, wherein said seat provides at least one of, a fixed back wall and a fixed side wall, apt to delimit and circumscribe a space of a passenger sitting on said seat.

14. The aircraft passenger seat according to claim 1, wherein said seat provides at least one of, a fixed back wall and a fixed side wall, apt to delimit and circumscribe a space of a passenger sitting on said seat.

15. The aircraft passenger seat according to claim 1, wherein said seat includes a telescopic screw for driving the translation movement of said movable part with respect to said fixed part.

16. The aircraft passenger seat according to claim 1, further comprising sliding telescopic guides that are parallel to said translation axis, the telescoping guides being disposed between said fixed part and said movable part.

17. A pair of aircraft passenger seats according to claim 1, alongside one another, wherein each seat is turned in a direction opposite the other direction so that each passenger sitting on a seat is turned to another passenger sitting on another seat.

18. The pair of aircraft passenger seats according to claim 17, wherein the recline axis of each seat is parallel to the recline axis of another seat, but the axes do not coincide.

19. The pair of aircraft passenger seats according to claim 17, wherein the translation axes of each seat are parallel to one another, but not parallel to the recline axes.

20. An aircraft cabin comprising a longitudinal axis and comprising at least one aircraft passenger seat according to claim 1, wherein the translation axis of each of said at least one seat is parallel to the longitudinal axis of said cabin.

21. The aircraft passenger seat according to claim 1, wherein said translation axis is oriented with respect to said recline axis by a predetermined fixed angle comprised between 2° and 12°.

22. The aircraft passenger seat according to claim 21, wherein said translation axis is oriented with respect to said recline axis by a predetermined fixed angle equivalent to about 5°.

23. A pair of aircraft passenger seats, alongside one another, wherein:
   each seat is turned in a direction opposite the direction of another seat so that each passenger sitting on a seat is turned to face another passenger sitting on another seat and each seat comprising:
      a fixed support portion and a movable portion that is movable with respect to said fixed support portion, said movable portion including a back part and a sitting part, said seat being turned in a first direction so that a passenger sitting in said seat is turned in said first direction, said seat being configured in such a manner that said movable portion performs a recline movement along a respective recline axis between a sitting position and a recline position, and vice versa, in a plan view of said seat, said recline axis being an apparent axis of substantial symmetry of the seat;
   wherein each seat is configured so that the movable portion performs a translation movement with respect to the fixed portion parallel to a single and predetermined translation axis, wherein from a plan view of said seat, said translation axis is oriented with respect to said recline axis by a predetermined fixed angle comprised between 2° and 18°;
   wherein each seat is configured to perform said translation movement before performing said recline movement from said sitting position to said recline position or during said recline movement;
   further comprising a leg rest arranged so that when a seat is in the maximum recline position, said back part, said sitting part, and said leg rest cooperate to form a bed element for accommodating a passenger in an extended position;
   wherein said leg rest has one of, a substantially trapezoidal or triangular shape, with the narrowest portion arranged at the feet of a passenger sitting on the seat;
   wherein each seat includes at least one of, a fixed back wall and a fixed side wall, for delimiting and circumscribing a space of a passenger sitting on said seat;
   wherein each seat includes a telescopic screw for driving the translation movement of said movable part with respect to said fixed part;
   further comprising sliding telescopic guides that are parallel to said translation axis, the telescoping guides being disposed between said fixed part and said movable part;
   wherein the recline axis of each seat is parallel to the recline axis of another seat, but the axes do not coincide;
   wherein the translation axes of each seat are parallel to one another, but not parallel to the recline axes;
   further comprising a central dividing septum arranged between the two seats connecting the leg rests of each seat and dividing a space allocated for the two seats; and
   wherein the translation axis of each seat of said pair of seats is parallel to a longitudinal axis of said aircraft.

\* \* \* \* \*